United States Patent [19]

Polad et al.

[11] Patent Number: 4,555,610

[45] Date of Patent: Nov. 26, 1985

[54] LASER MACHINING SYSTEM

[75] Inventors: Michael D. Polad, Mendota; LeRoy E. Gerlach, Bloomington; Robert H. Schmidt, Minnetonka, all of Minn.

[73] Assignee: Data Card Corporation, Minnetonka, Minn.

[21] Appl. No.: 531,777

[22] Filed: Sep. 13, 1983

[51] Int. Cl.⁴ .............................................. B23K 26/00
[52] U.S. Cl. .................... 219/121 LA; 219/121 LB; 219/121 LH; 219/121 LV; 219/121 FS; 364/474
[58] Field of Search ................. 219/121 LA, 121 LB, 219/121 LC, 121 LD, 121 LG, 121 LN, 121 LH, 121 LJ, 121 LU, 121 LV, 121 LX, 121 LY, 121 FS; 364/167, 178, 179, 174, 474, 475; 372/29, 30, 34, 35

[56] References Cited

U.S. PATENT DOCUMENTS

| | | | |
|---|---|---|---|
| 3,281,712 | 10/1966 | Koester | 219/121 LA |
| 3,609,585 | 9/1971 | Ridgefield | 372/35 X |
| 3,703,813 | 11/1972 | Olevitch et al. | 372/34 X |
| 3,735,282 | 5/1973 | Gans | 372/35 X |
| 4,114,018 | 9/1978 | Von Allmen et al. | 219/121 LB X |
| 4,326,118 | 4/1982 | Smith | 219/121 LD X |
| 4,338,577 | 7/1982 | Sato et al. | 372/29 X |
| 4,357,664 | 11/1982 | Imazeki et al. | 364/474 |
| 4,398,241 | 8/1983 | Baker et al. | 364/167 |
| 4,459,525 | 7/1984 | Hasegawa | 364/174 X |
| 4,469,930 | 9/1984 | Takahashi | 364/475 |

FOREIGN PATENT DOCUMENTS

| | | | |
|---|---|---|---|
| 0062517 | 10/1982 | European Pat. Off. | 219/121 LA |
| 0063699 | 7/1978 | Japan | 219/121 LU |
| 0100523 | 7/1980 | Japan | 219/121 FS |

Primary Examiner—C. L. Albritton
Attorney, Agent, or Firm—Kinney & Lange

[57] ABSTRACT

A laser machining system with x, y and z-axis beam manipulating mechanisms to perform welding, cutting and localized heat treating operations on a workpiece with the operation of the system for each operation and the changeover between operations being under the control of an automatic control system. A computer numerical control (CNC) system provides control of the laser functions and movement of the laser beam using a sampled-data following error servo system.

19 Claims, 9 Drawing Figures

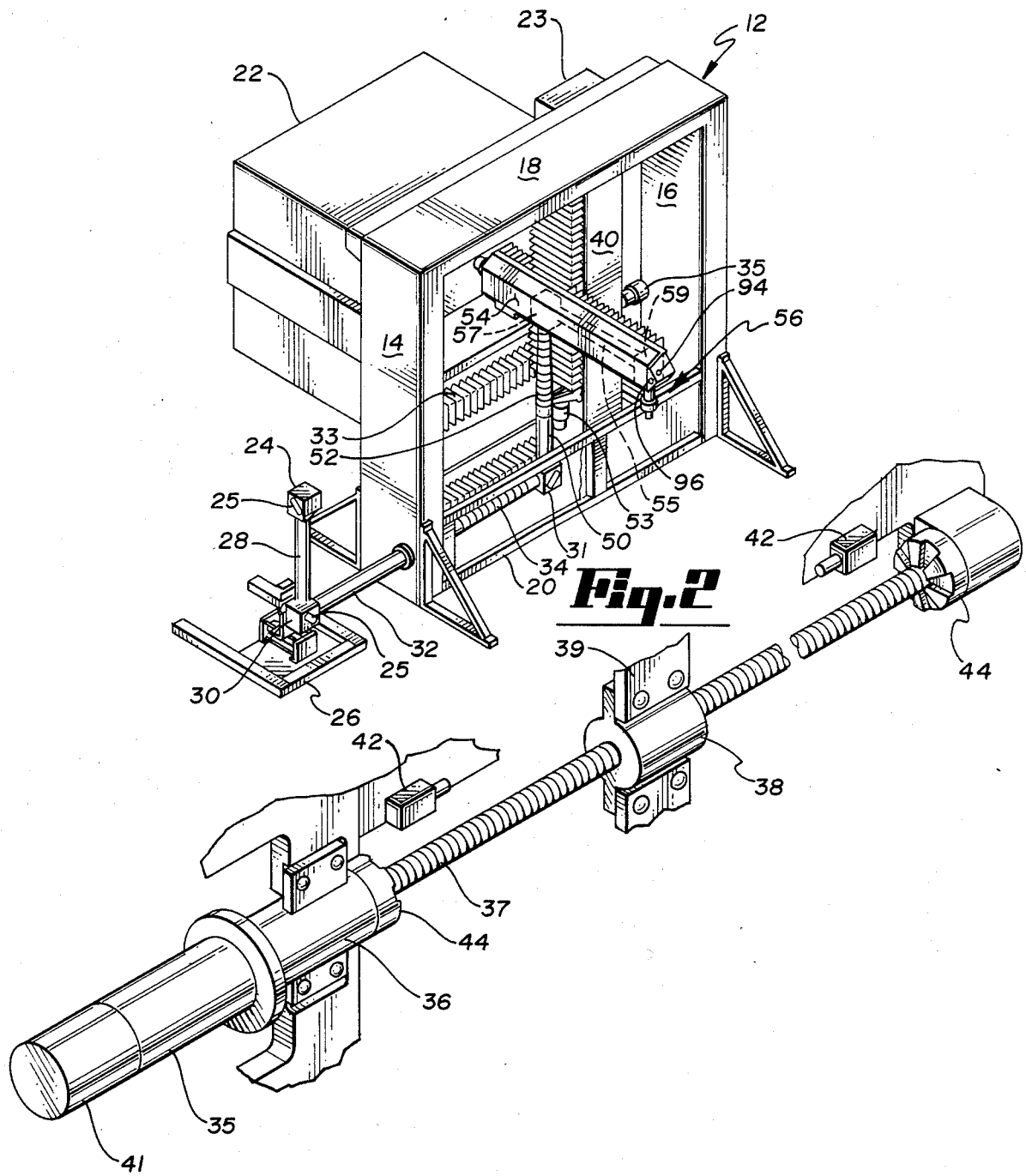

| Fig.5a | Fig.5b |
|--------|--------|
| Fig.5c | Fig.5d |

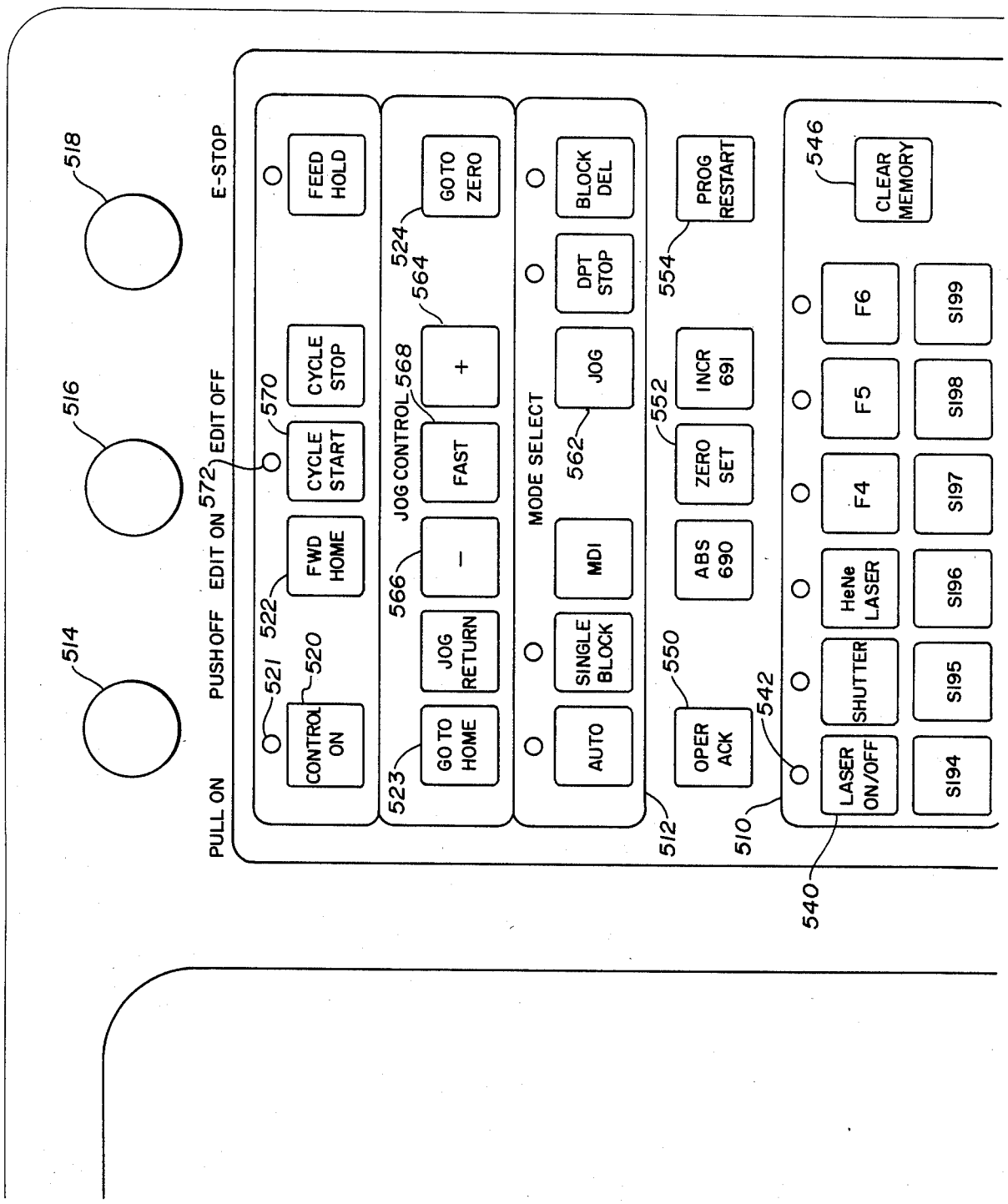

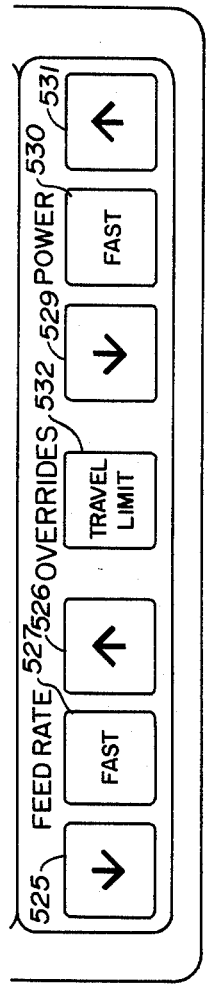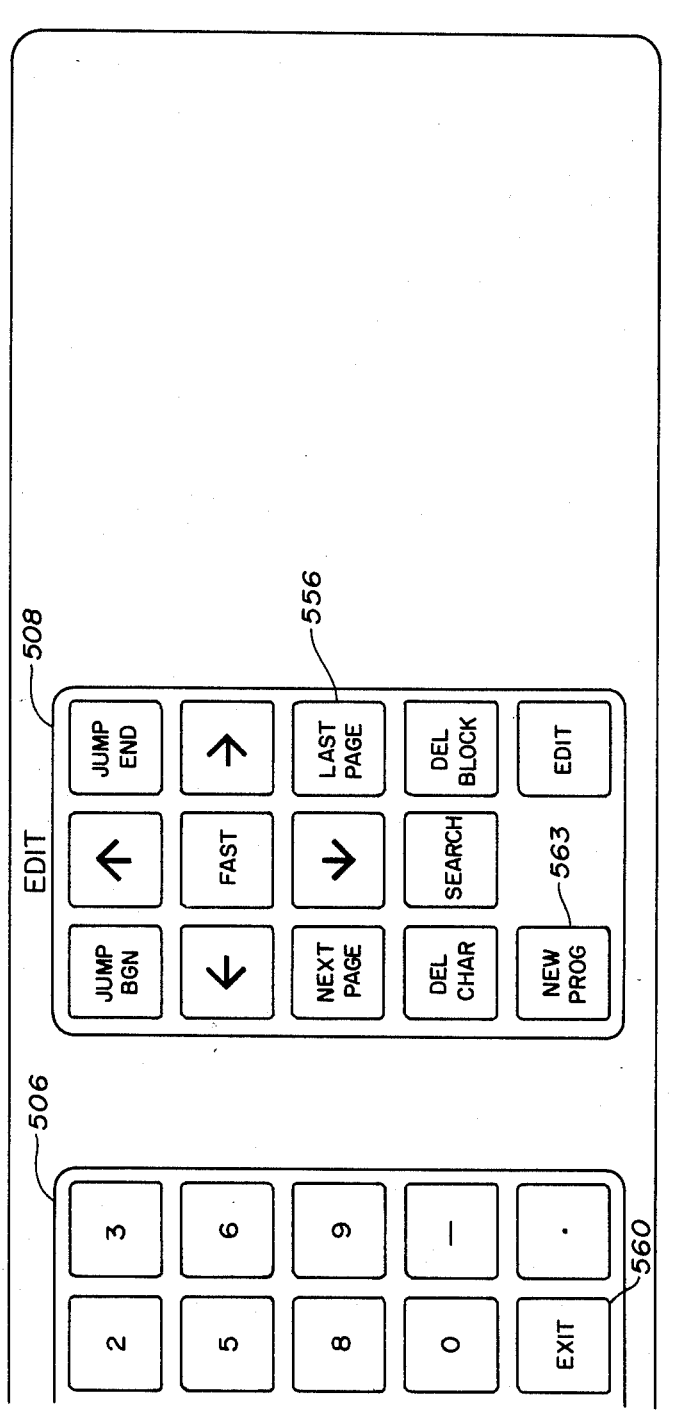
Fig. 5d 4,555,610

LASER MACHINING SYSTEM

BACKGROUND OF THE INVENTION

1. Field of the Invention

This invention relates to machine tools and more specifically to a laser machining system in which the laser beam is moved in three axes relative to a fixed workpiece.

2. Prior Art

Most prior art laser machining systems have been systems, such as the one shown in U.S. Pat. No. RE. 31,092, in which the workpiece to be machined has been moved in one or two axes relative to the laser beam used to do the machining operations. The system design for the workpiece moving apparatus has been restricted because the design was largely borrowed from laboratory type moving tables.

The other major prior art area from which laser machining systems have borrowed is non-laser heavy metal removal machines and plate processing equipment. Such existing systems are not suitable for high-speed contouring at speeds up to 500 inches per minute, for example.

It would, therefore, be an advance in the art to increase the production capacity and flexibility of laser machining systems by the control of the laser beam in three independent axes. The same automatic control system which controls the manipulation of the laser beam can be used to control the operation of the laser, the application of proper working gases and all of the operations necessary for automatic operation.

SUMMARY OF THE INVENTION

It is a principal object of this invention to provide each of the above-enumerated advances. More specifically, it is an object of this invention to provide a three axis controlled laser machining system wherein the workpiece remains stationary as the beam is controlled by an automatic control system.

It is an additional specific object of this invention to provide an automatically controlled laser machining system wherein the power output and other laser operating characteristics are automatically controlled and continuously variable as the beam is moved over the workpiece block by block in accordance with a stored part machining program.

BRIEF DESCRIPTION OF THE DRAWINGS

FIG. 1 is a perspective view of the laser machining apparatus of the present invention;

FIG. 2 is a perspective view of the servo motor and leadscrew used to move one of the three machine axes;

DETAILED DESCRIPTION OF THE DRAWINGS

Mechanical Structure of the System

Figure 3:
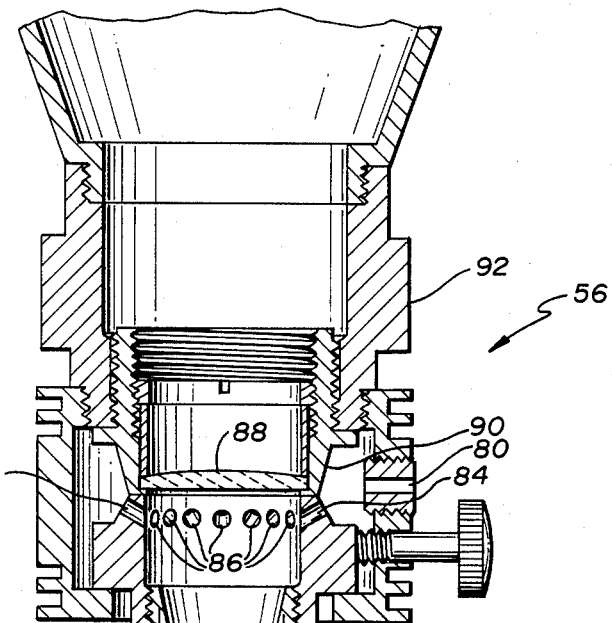
FIG. 3 shows the gas housing, objective lens, spacer and nozzle assembly mounted on a workstation.

In FIG. 1, a rugged weldment box type main frame 12 is shown having vertical side members 14 and 16 and horizontal top and bottom members 18 and 20, respectively. The workpiece to be machined by the system is held in a fixed position relative to main frame 12. A rear guard enclosure 22 provides a protective shield at the rear of the machine and an electrical box 23 encloses much of the beam positioning electrical control circuitry for the workstation.

If desired, the workpiece may be attached to a separate table and base. It is also possible to attach the workpiece to one or more rotary tables, each of which includes its own servo drive. The control system according to the present invention includes controls for the drive of the rotary table to allow the use of one or two rotary tables as additional axes of the workstation. In a particular application, for example, a rotary table may be mounted on a rotary table to impart complex rotary movement to a workpiece. The movement of both rotary tables can be controlled by the control system.

A first laser beam bender 24 is mounted on a separate beam bender support structure 26 which is positioned adjacent to main frame 12 of the workstation. Beam bender 24 is connected to receive a laser beam from a high power commercially available laser source which is not explicitly shown. The machining system is designed for operation with a variety of commercially available laser sources having power output capability up to 5000 watts continuous power and higher power levels when the output power is pulsed. In all cases, the laser power source generates a beam of laser energy that is delivered to the laser machining workstation.

The output of first beam bender 24 is conducted along a first beam path in enclosure 28 to a second beam bender 30 which redirects the laser beam to a new direction displaced from the original direction by 90 degrees. Each of the beam benders such as 24 and 30 contain mirrors 25 for deflecting the laser beam. The mirrors are generally available commercially from a wide variety of suppliers and are typically 2 or 3 inch diameter molybdenum or protected silicon mirrors depending upon the particular laser source which is selected. In order to accommodate the high power laser beam used in the machining operations, the beam benders include provisions for water cooling. In order to protect the mirror assemblies in the beam benders from damage, temperature sensors are mounted within the beam bender housings to provide error or interlock signals to the automatic control system to command a shut down of the laser power source in the event of a detected excess temperature.

The beam path enclosures of the machining system, such as enclosure 28, protect the beam from contaminants in the atmosphere and prevent operator exposure to laser energy along the beam path. Air cointained within the beam path enclosures is filtered and pressurized to further protect against either beam diffusion or optics contamination which could be caused by stray dust or dirt particles.

The laser beam leaves the second beam path bender 30 and beam path enclosure 32 conducts the beam through the vertical side member 14 of the main frame 12 and into the x-axis adjustable travelling column beam path enclosure 34 which is mounted within the main frame 12. Enclosure 34 terminates with a third beam bender 36 which redirects the laser beam from the horizontal plane to a vertical plane. Enclosure 34 is a collapsible tube which remains sealed as it is extended and collapsed by the action of a servo motor 35 driven screw 37 oriented parallel to enclosure 34 and enclosed within a protective accordion pleated cover 38.

The servo motor assembly for the x-axis is shown loading from the rear of the machine in FIG. 2 with the pleated cover 38 removed. The shaft of servo motor 35 is connected through a suitable thrust bearing assembly 36 to a threaded shaft 37 upon which a ball nut 38 is mounted for movement along the shaft as the shaft is rotated by the servo motor. Ball nut assembly 38 contains a number of ball bearings which are secured within the assembly for rolling content with helical grooves in shaft 37 to cause the ball nut assembly to move along shaft 37 as it is rotated. Ball nut 38 is then connected through a suitable link 39 to movable element 40. For the x-axis movement, servo motor 35 moves vertical support 40 arm back and forth along bearing blocks mounted on upper and lower frame members 18 and 20. An optical encoder 41 is also attached to the motor 37 to provide continuous information to the control electronics on the position of the shaft. Appropriate limit switches 42 and mechanical stops 44 are also provided to back up the output of the encoder and provide an automatic electronic indication that ball nut 38 has reached the maximum extent of its travel. Mechanical stops 44 provide a positive stop for ball nut 38 if the axis is moved beyond its intended limits.

The vertically oriented laser beam leaving third beam bender 36 enters the z-axis path enclosure which has a rigid section 50 and a collapsible portion 52. The z-axis path enclosure is driven by a leadscrew driven by a servo motor 53 which extends or collapses enclosure 52 in accordance with drive commands provided by the control electronics.

The laser beam leaves the z-axis path enclosure 52 and enters the y-axis ram 54 which has a collapsible optical path conduit 55 enclosed within it. The beam is redirected from the z-axis to the y-axis by a fourth beam bender 57 (shown in dashed lines) which is slidably located within the ram 54 where it intersects with the z-axis path enclosure 52. At the other end of ram 54 and y-axis path enclosure 57 (shown in dashed lines), a fifth beam bender 59 (shown in dashed lines) is rigidly mounted to redirect the laser beam from the y-axis back to the z-axis to direct the beam downwardly to the workpiece. Y-axis adjustments are made by extending and retracting ram with a lead screw and servo motor.

A water cooled focussing lens assembly 56 focusses the beam on the work material surface and allows the focussing point to be moved above or below the working surface as desired. Different focal length lenses can also be substituted.

It is also possible to mount a gas housing on the end of ram 54 surrounding the lens assembly 56. FIG. 3 shows a gas housing and objective lens combination 56 mounted on the work station. Various working gases can thereby be applied to the surface of the workpiece in the course of machining operations under control of the CNC program.

As shown in FIG. 3, lens assembly 56 has an extending nozzle 58 portion attached to it. A nozzle 60 is threadably mounted in a nozzle holder 62 and secured with a lock ring 64. Nozzle 60 has an internal conical chamber 66 which exits at aperture 68 immediately above the surface 70 of the workpiece.

Nozzle holder 62 is threadably mounted in spacer 72 which is attached to a further nozzle 74 which also has a conical control chamber 76 and aperture 78 which communicates with chamber 66 and aperture 68 of nozzle 60.

Gas is introduced into the nozzles through a gas inlet port 80 in surrounding gas housing 82. Gas jets 84 and 86 allow the gas to enter chamber 76 and to be applied to surface 70 of the workpiece. The objective lens 88 is mounted in a lens mount 90 which is threadably secured in a housing 92 which is in turn mounted at the end of ram 54 coupled to the fifth beam bender 57.

In order to protect the safety of the operator of the machine, the end of the y-axis ram 54 has an indicator 94 mounted on it to show whether the laser is turned on. There are also two indicators 96 at both sides of ram 54 which show the status of the laser shutter which selectively interrupts the laser beam path.

Structure and Organization of the Control System

Figure 4:
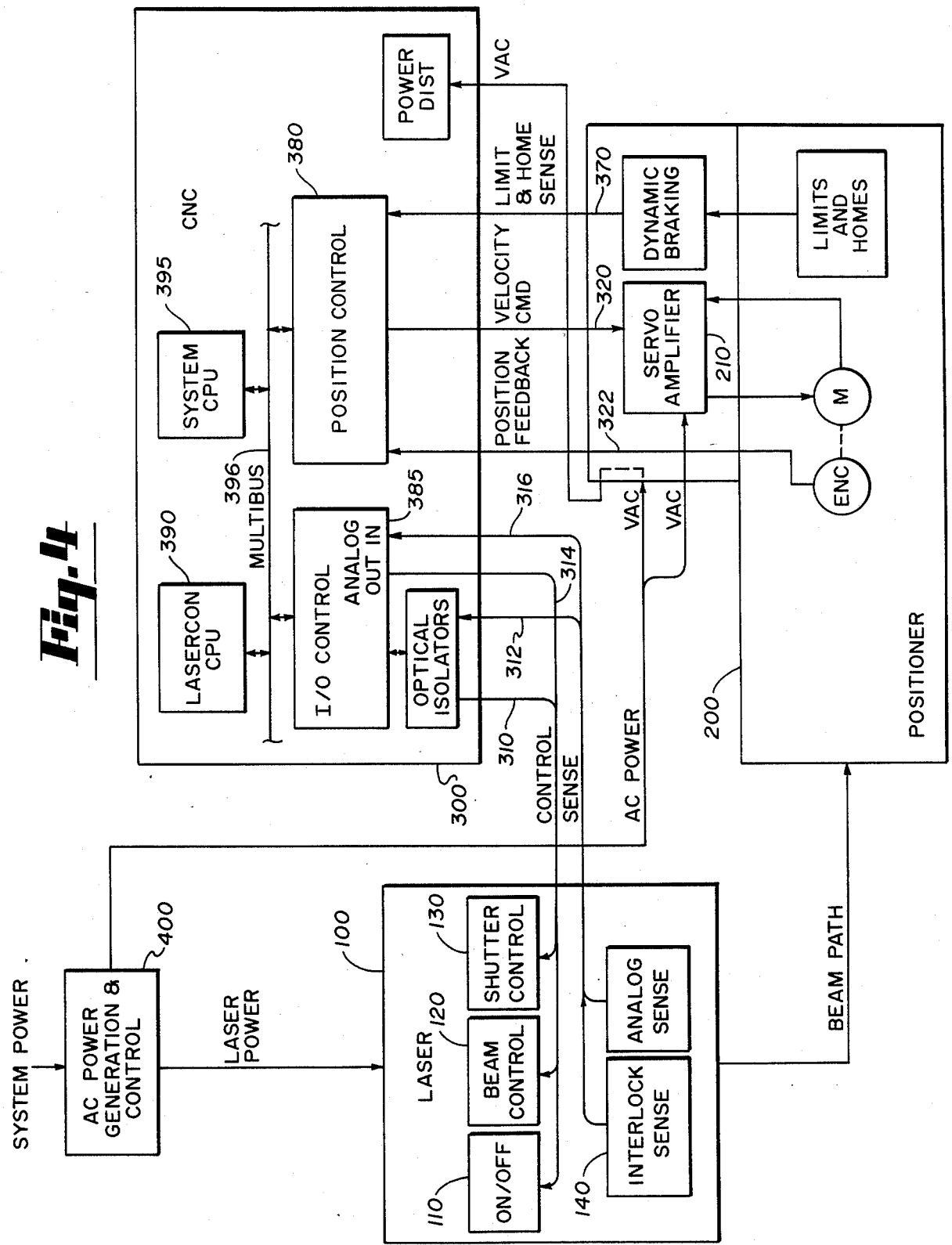
FIG. 4 is a block diagram of the control electronics of the laser machining system of the present invention.
Figure 5A:
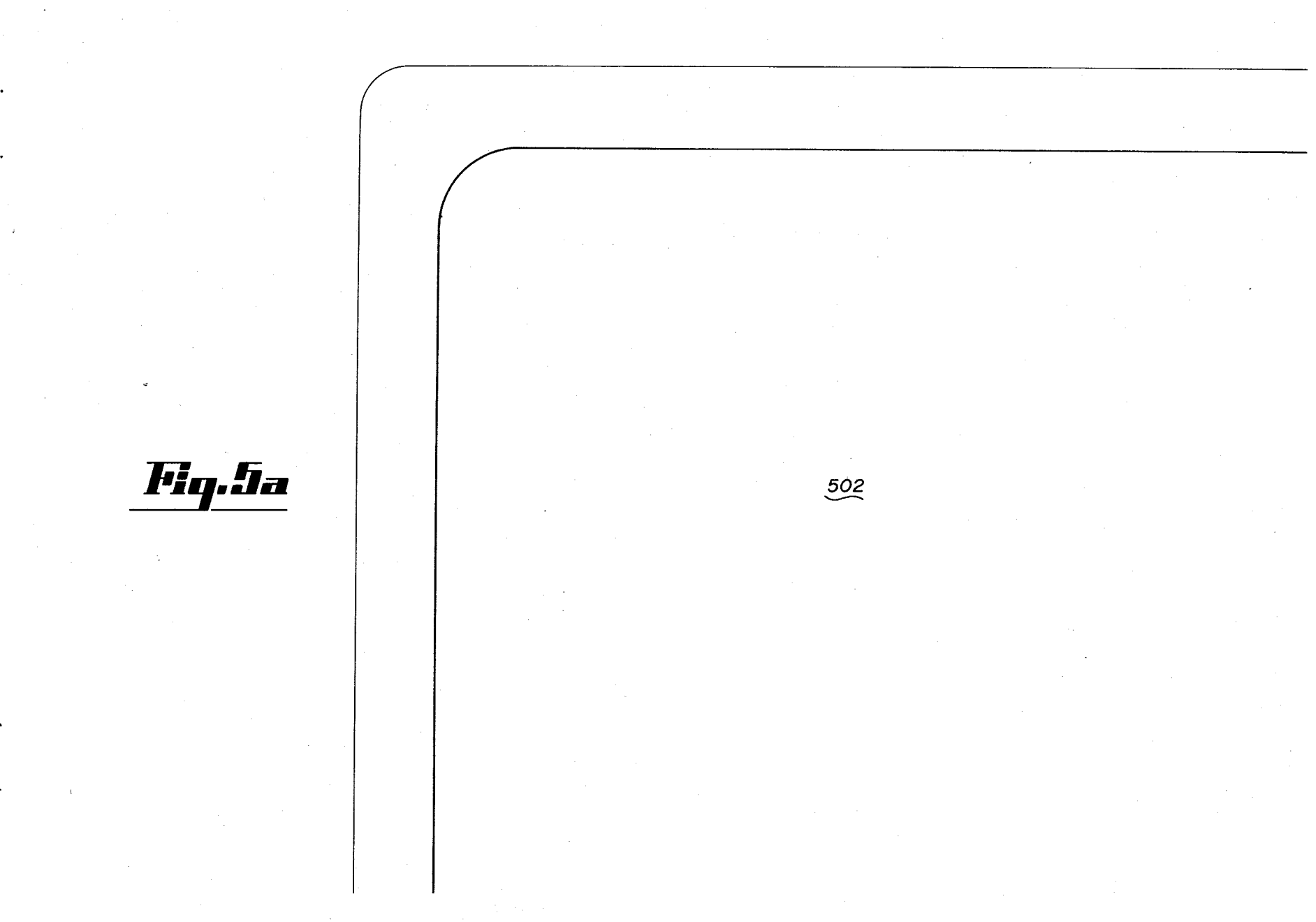
Figure 5C:
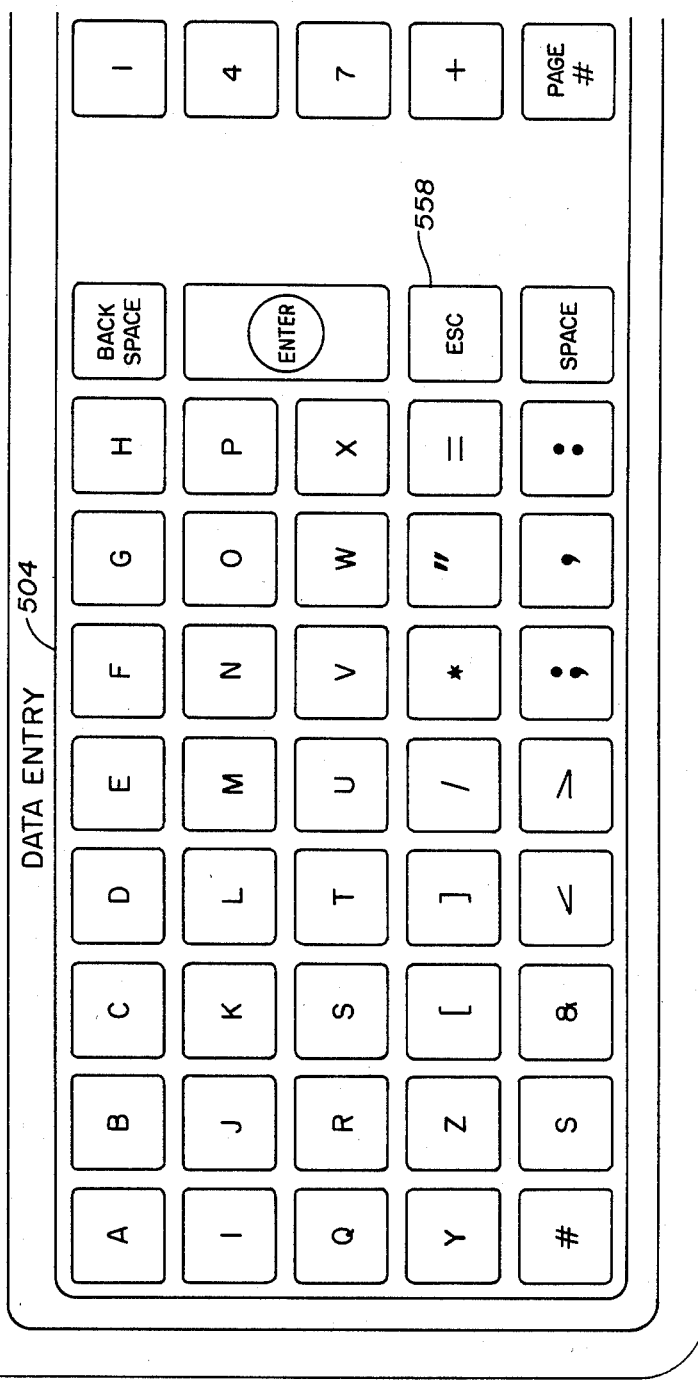

FIG. 4 is a block diagram of the CNC controls for the laser machining system shown in FIGS. 1 through 3. FIGS. 5A–5D show the control panel for the machining system. As can be seen from the block diagram, the control consists of the laser power source 100, the beam positioner 200, the computer numerical control 300 and the AC power control portion 400.

The computer numerical controller on CNC 300 is the heart of the laser machining system. Although the particular CNC disclosed herein may have broader applicability than merely the control of the disclosed three axis laser machining system, it has been optimized for the control of that laser machining system.

Figure 5:
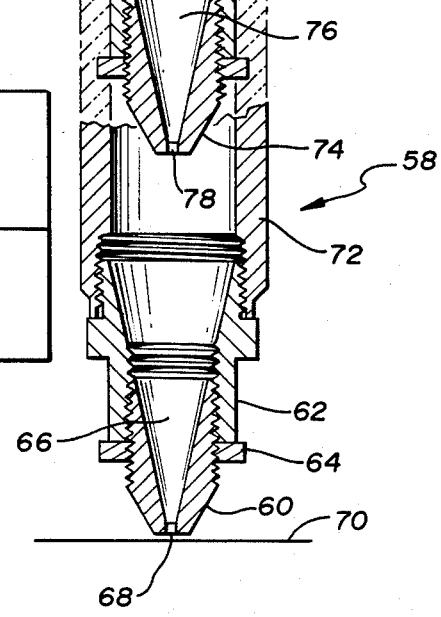
FIG. 5 is a layout of FIGS. 5A–5D which are a pictorial view of the CNC control panel.

The CNC 300 is housed in a separate enclosure, and connections to the laser 100 and the positioner mechanisms in positioner 200 are made by the means of cables. The control panel shown in FIG. 5 is mounted on the housing for the CNC. The connections to the laser are cables 310 and 312 which are multiple conductor control and sensing cables connected to input and output optical isolators, while cables 314 and 316 are analog output and input cables from the CNC to the laser.

The interfaces between the CNC 300 and the beam positioner electronics 200 are servo velocity command signals for each of the three axes shown as cable 320. The position feedback signals for each of the three axes are fed back to CNC 300 on cables generally designated as 322. The CNC system functions as a sampled data following error system which reads the actual axis position from the encoder once each sampling interval and updates the axis velocity command. The velocity command is based upon the position or following error. Because the command is in terms of velocity, the CNC can control closely the operation of the machine without calling for axial movements which would require velocities which are unsafe or unrealizable.

The other signals from the positioner electronics which are provided to CNC 300 are the limit and home sensing signals which are delivered on cables generally designated 370. In addition to the intercommunication of the signals explained above, there are also AC power interlocks from the power control block 400 to the positioner 200 to CNC 300.

As indicated in FIG. 4, the laser control module 100 has a number of control functions which operate under the control of CNC 300. The laser On-Off block 110, the beam control 120 and the shutter control 130 are operated under the control of the CNC part machining program. The laser power output is continuously variable. It may be varied each time that a new block of the machine tool machining program is executed. Similarly, the laser block 100 provides outputs from its interlock sensors 140 and its analog sensors to CNC 300 to allow the CNC to keep the laser within the proper operating parameters as it carries out a part machining program.

The positioner electronics is the circuitry for providing the control to the servo motor shown in FIG. 3 and the other servo motors which control the other two axes. The encoder outputs are fed back to the position control block 380 of CNC 300.

The CNC 300 contains, in addition to position control block 380, an I/O control portion 385, a laser control CPU 390 and a system CPU 395. Both CPUs are 16-bit microprocessors. The major blocks 380, 385, 390 and 395 are interconnected and communicate with each other by means of multibus 396.

The CNC 300 can be best understood by discussing its operation. The operation of the CNC is controlled by the control panel shown in FIG. 5.

Control Panel

FIGS. 5A–5D show the CNC control panel 500 which is a part of the CNC shown in FIG. 4, interfacing with the multibus 396, as well as directly with the laser control CPU blocks 390 and the system CPU block 395. As shown in FIG. 5A, the control panel includes a CRT screen 502, a data entry alphacharacter keyboard generally designated 504 and a numeric keyboard generally designated 506. The keyboards utilize one piece flexible membrane assembly switches having both audible and tactile feedback. In addition to alphacharacter and numeric keyboards 504 and 506, there is a separate pad of edit controls 508. In the right-hand portion of the control panel in FIG. 5B, there are a series of function and subroutine switches 510, as well as a series of mode select switches 512. At the top of the panel, there are three individual switches used for controlling the system. Those switches are the power on/off switch 514, the edit lock key switch 516 and the emergency stop switch 518.

As will be discussed more thoroughly below, the CNC always operates in one of two major operating modes designated "control-on" or "emergency stop." The six mode select switches generally designated 512 are used to choose a minor mode of operation and are discussed separately below.

On/Off

The main power on/off switch 514 powers up the system in its emergency stop operating mode so that there is no chance for inadvertently applying power to the system and causing any of the axes of the system to commence motion based on a stored command.

Edit Lock Key Switch

The edit lock key switch 516, when activated, prohibits editing or program entry from the system keyboard. In the edit off position, it disables the "edit" and "new program" keys which are located in the edit controls key pad 508 and also disables other user selectable keys.

Emergency Stop

The emergency stop or E-stop mode of operation is activated by pushing the large pushbutton 518 located on the top right of control panel 500. When the E-stop button 518 is activated, the system exits the control-on mode. Once the system goes to the E-stop mode, it remains in that mode, even after the E-stop button is released. When the system is in the E-stop mode it issues a zero velocity command to each of the servo controllers for each of the three axes and, if a rotating workpiece table is being controlled by the system, it gives a zero velocity command to the servo drive for the work table. The selection of the E-stop mode also deactivates the "enable" output to the servo amplifiers 210 in the position control circuitry 200. It also deactivates all of the "M function outputs" which control the laser output. When the E-stop mode is effective, an indication is presented on the system CRT. To exit from the E-stop mode, the CONTROL ON button 520 must be pressed.

In the E-stop mode, no servo motion can be commanded because both program execution and jogging are disabled. In the E-stop mode, extremely slow servo motion or drift may occur, depending on the type of servo amplifier used. The encoder outputs are presented to the CNC 300, and the system keeps track of the position of the servos, but makes no attempt to correct the position. Thus, the E-stop mode is the only mode where servo motion is not controlled by the CNC 300. In order to exit the E-stop mode, the control-on key is depressed. The control-on key 520 is located on the system control panel above the mode select switches 512 as shown in FIG. 5, and an indicator 521 shows whether or not the key 520 has been actuated.

Control-On

Pressing the control-on key 520 alternately selects the control-on or the E-stop mode. In the control-on mode, servo amplifiers are activated (unless hardware or software limit switches are also activated), and servo motion is generally allowed with the exception of the FIND HOME suboperating mode discussed immediately below. When the control-on switch 520 is activated, the command position for all axes is set to the current relative position so that no initial motion will occur, even if the servos had been manually moved from their reference positions while the system was previously in the E-stop mode. The system CRT normally displays the term "control-on" while the system is in the control-on mode.

FIND HOME

Pressing the FIND HOME key 522 will disable software travel limits of the various adjustable axes and cause each servo to move to a "machine home" position. The machine home position is a fixed, preset axis position which provides an unchanging position with respect to the work table surface for setting software travel limits or other uses. The servos each move to the machine home position in a specified order and at the homing feed rate. If the axis limit switch is already activated when FIND HOME is pressed, the axis will first move in the direction opposite to the homing direction until the home switch is deactivated. Once the machine home is reached, the relative and absolute position counters are set to zero and software travel limits are enabled. Pressing FIND HOME switch 522 automatically sets the input mode and scale factors, cancels axis rotation and sets traverse modes as discussed more thoroughly below. Each time that the system is powered up, FIND HOME 522 should be activated. The FIND HOME subcontrol mode will function only when the system is in the control-on mode. Until servo homing has been completed, part programs cannot be run.

GO TO HOME

The GO TO HOME button 523 will cause all servos to simultaneously move to machine home at the rapid traverse feed rate

GO TO ZERO

Pressing the GO TO ZERO button 525 will cause all of the axis drive servos to simultaneously move to a relative zero position at the rapid traverse feed rate. The relative zero position is the position defined relative to the zero-reference point either set by the operator using the ZERO SET key 552 or within a particular part program using a programmed command.

Data Entry Keyboard

The basic system data entry keyboard is comprised of the alphacharacter portions 504 and the numeric keyboard 506. The data entry keyboard is used to enter data and control commands simply by pressing the desired keys.

Editing Controls

The key pad 508 contains the editing controls. The editing controls are used to edit part programs during and after entry. Basically, they move the screen cursor to a desired point to allow changes to be made to a part program.

Override Controls

The override controls are located in a separate section 524 of the control panel. There are three override controls: feed rate, travel limits and laser power. These controls are used to override the programmed values for feed rate and laser power and to manually enable the servo amplifier to function while a travel limit switch is activated. The feed rate override control consists of three switches 525, 527 and 526, which are respectively used to decrease the feed rate, to increase the feed rate or to increase the rate of change of the feed rate as either the increase or decrease rate switch is depressed.

When an override control is held down, the override percentage will change, in one-percent increments, at the rate of approximately twelve percent per second. If the adjacent fast key is held down at the same time that the override switch is held down, the override percentage will change in three percent increments at the rate of approximately 64% per second.

The laser power override controls 529, 530 and 531 work in a similar manner, with the decrease switch 529 and the increase switch 531 being modified by the fast switch 530. The laser power and feed rate controls allow continuous adjustment of the feed rate and laser power from zero percent to 150% of their programmed values. The programmed feed rate and laser power, the override percentages and the resultant feed rate and laser power are all displayed on CRT 502 in a standard data display. The override switches can be disabled by appropriate commands in the programming.

In order to keep the feed rate from exceeding the maximum feed rate set by a particular system parameter, the CNC 300 will automatically limit the actual feed rate as required to keep all of the feed rates of each axis below its preset maximum values. In this case, the resultant feed rate and the display of the resultant feed rate will be the value as limited by the system maxima and will not equal the programmed feed rate times the override percentage.

The travel limit override control switch 532 allows jogging an axis away from an activated limit switch and is discussed further below.

Function and Subroutine Switches

Six momentary pushbutton switches and indicators, generally designated 510, comprise the function switches which control specified relay outputs. A typical momentary switch 540 has an associated LED indicator 542. These switches may be user assigned to perform various functions. In FIG. 5B, the switch has been set up to control the laser On/Off condition. When a switch closure is detected, the output state is reversed. In other words, the ON condition switches to an OFF and the OFF switches to an ON. The indicator 542 is lit whenever the output is ON.

In addition to the function switches F in the function and subroutine subpanel 510, there are also six additional switches 544. Each of those switches are also provided to control the execution of specified subroutines assigned by the user. Pressing a subroutine switch will cause immediate execution of a program subroutine corresponding to that key number, as defined either in the current program or in the system control EPROM, if desired. In order to utilize the subroutines, the system must be in the control-on mode and not executing a current program when the subroutine switches 544 are activated.

Miscellaneous Controls

Six additional keys on the control panel 500 also require some discussion. The clear memory key 546 erases all part programs from the system memory. When clear memory is pressed, the system will generate a prompt signal to confirm that the operator indeed wants to erase the memory. After the operator confirms that this is his intent, the memory is cleared and all part programs from the system memory are destroyed. If any other key is depressed after the generation of the confirming prompt, memory will not be cleared.

The operator acknowledge key 550 is used to clear an error message or an operator message from the CRT display screen. If the error which caused the generation of the original error message to CRT screen 502 persists at the time operator acknowledge 550 is depressed, the error message will again appear on the display screen after the switch is depressed.

Zero set key 552, when pressed, will initiate no servo motion, but will set the relative position counters for each of the servo axes to zero.

Program restart switch 554 moves the program pointer to the start of the active program. This key is depressed whenever it is desired to start at the beginning of a program.

Page number switch 556 selects a display format for CRT 502.

Escape key 558 displays a menu of diagnostics and utility programs. After the menu appears, a desired program can be selected by pressing the numeric key corresponding to the program number.

Exit key 560 causes the CNC to exit the minor mode which it is presently in. It also changes from display page 4, 5, 6 or 7 to display page 1 on the CRT when actuated.

Jog Controls

Jog mode select switch 562 enables a jog mode to be activated. Jogging allows the operator to move the axes to a desired location without writing a specific program block. The jog mode is only activated when the system is in the control-on mode.

When the jog mode is entered, the default operating submode will be manual. In this default operation, a selected axis will be moved as long as the appropriate jog plus key 564 or jog minus key 566 is depressed. The fast key 568 adjacent the jog plus and jog minus keys 564 and 566 causes the system to jog at a higher feed rate. The axis in which the jogging commands are to be executed is input using the alphacharacter keyboard 504. The increment size of the jogs may also be selected by appropriate numeric keyboard 506 command. The system is removed from the jog mode by pressing the exit key 560.

Operation Summary

The laser machining system is normally used to execute part programs in a fully automatic manner. The control system is powered up and the laser power source is activated. Control panel 500 is used to home the various axes and, if necessary, the various axes are jogged to position the lens assembly 56 in a proper initial relationship to the workpiece. A part program is transferred from a suitable storage device to memory in the CNC 300 or the program may be entered manually using the new program key 563 on the control panel 500 and then inputting the program using the alphacharacter keyboard 504 and the numeric keyboard 506.

The part program is then checked for errors by running it in the CHECK RUN mode. In the CHECK RUN mode, the program is executed by the CNC 300, but not acutally fed to the servos to move the axes. After the program is confirmed to be error free, the feed rate and laser power overrides are set as appropriate and the program execution modes selected. The cycle start switch 570 is depressed and its indicator 572 will be lit while the program is executing. The execution will normally commence at the current location of the program pointer. The program pointer may be positioned at any desired point within the program, either by pressing the program restart key 554 to move the pointer to the start of the program or using the EDIT mode to set the pointer as desired.

In carrying out part programs, the machine and CNC have a wide variety of control options which may be carried out by various programmed subroutines. For example, a stored program can be called to generate charcters for automatic marking on a part. A single line of input code allows the operator to produce a desired string of characters on a part.

The programming can be used to operate the laser power source in a pulsed mode and programming may be used to conveniently set the distance between output pulses and the width of pulses.

The laser power output may be programmed to change during the program. The transition from one power level to another can be selected to be a step change or a ramp change, as desired.

What is claimed is:

1. A machining system utilizing a laser beam for machining a stationary workpiece, comprising:
    a frame constructed and arranged for positioning adjacent the stationary workpiece;
    first optical path means oriented along a first axis relative to the frame and constructed and arranged for extension and retraction along the axis thereof in response to a first command signal, the first optical path means operatively coupled to the laser for receiving the beam at one end thereof and for delivering a collimated laser beam at an output end thereof;
    second optical path means oriented along a second axis relative to the frame and constructed and arranged for extension and retraction along the second axis in response to a second command signal, the second optical path means operatively coupled to the output end of the first optical path means for receiving the beam therefrom at one end and for delivering a collimated laser beam at an output end thereof;
    third optical path means oriented along a third axis relative to the frame and constructed and arranged for extension and retraction along the third axis in response to a third command signal, the third optical path means operatively coupled to the output end of the second optical path means for receiving the beam therefrom at one end and for delivering a collimated laser beam from an output end thereof to a workpiece; and
    control logic means for generating first, second and third command signals to move the laser beam across the workpiece in accordance with a machining program, and including laser control means for generating command signals for varying the intensity of the laser beam in accordance with the machine program to match the machining characteristics of the laser beam to the stored characteristics of the workpiece.

2. The system of claim 1 wherein focussing means are mounted at the output end of the third optical path means for directing the beam therefrom to the workpiece.

3. The system of claim 2 wherein the focussing means includes cooling means for controlling the temperature rise of the focussing means.

4. The system of claim 3 wherein the focussing means also includes means for dispensing working gases under control of the control logic means.

5. The apparatus of claim 1 wherein the laser beam is coupled to the first optical path means by at least one beam bender and at least on fixed length optical path conducting means.

6. The apparatus of claim 1 wherein the axis of the first optical path means is aligned in the horizontal plane.

7. The apparatus of claim 6 wherein the axis of the second optical path means is vertically aligned.

8. The apparatus of claim 7 wherein the axis of the third optical path means is horizontally aligned.

9. The apparatus of claim 8 wherein beam bender means are mounted at the output end of the third optical path means for directing the beam into a vertical axis which intersects the workpiece.

10. The system of claim 1 wherein each of the first second and third optical path means comprises an input port at one end thereof and a beam bender at the other end thereof connected by a telescoping tubular conduit portion.

11. The system of claim 10 wherein the movement of each of the optical path means along its axis is produced by a lead screw aligned with the axis of each of the respective optical path means and driven by a servo motor in response to velocity command signals for that axis generated by the control logic.

12. The system of claim 11 wherein encoder means are coupled to the optical path means for producing an output signal which indicates the position thereof and the control logic means is constructed and arranged for operating as a sampled data following error system wherein the control logic reads the actual axis position from the encoder means and updates the axis velocity command periodically.

13. The system of claim 1 wherein shutter means are coupled to the optical path and are constructed and arranged for interrupting the optical path when in the closed position, the positioning of the shutter means being controlled by signals generated by the control logic.

14. The system of claim 1 wherein the first, second and third optical path means each include beam bender means for deflecting the beam path by 90 degrees.

15. The system of claim 14 wherein the beam bender means each include means for cooling the beam bender means and sensor means for providing a warning indication when the temperature of the beam bender exceeds a predetermined level; and wherein the control logic means is connected to receive the warning indications from the sensor means and is constructed and arranged for turning the laser beam off when the warning indication is received.

16. The system of claim 1 wherein the control logic means includes a single control switch for discontinuing operation of the system in accordance with the machining program and removing the first, second and third command signals to the first, second and third optical path means.

17. The system of claim 12 wherein the control logic means includes limit means coupled to receive the output signal of the encoder means and for comparing the position of a particular axis to a stored limit value generating a zero rate command signal when the position of the particular axis exceeds the stored limit value.

18. The system of claim 1 wherein the laser control means is constructed and arranged for varying the laser beam intensity each time that a block of the machining program is executed.

19. The system of claim 1 wherein the control logic means includes manually operated means for moving one of the first, second or third optical path means in selected increments under the control of a key.

* * * * *